United States Patent
Hartmann et al.

(10) Patent No.: US 6,217,696 B1
(45) Date of Patent: Apr. 17, 2001

(54) PLATE MOUNTING TAPE

(75) Inventors: Manfred Hartmann; Wolfgang Schacht, both of Hamburg (DE)

(73) Assignee: Beiersdorf AG, Hamburg (DE)

( * ) Notice: Subject to any disclaimer, the term of this patent is extended or adjusted under 35 U.S.C. 154(b) by 0 days.

(21) Appl. No.: 09/268,108

(22) Filed: Mar. 15, 1999

Related U.S. Application Data

(62) Division of application No. 08/749,591, filed on Nov. 15, 1996, now abandoned, which is a division of application No. 07/795,584, filed on Nov. 21, 1991, now abandoned.

(30) Foreign Application Priority Data

Dec. 17, 1990 (DE) .................................................. 90 16 999

(51) Int. Cl.$^7$ ................................ B32B 31/00; C09J 7/02
(52) U.S. Cl. ......................... 156/247; 156/313; 156/327; 156/338; 428/343; 428/354
(58) Field of Search ..................................... 156/247, 313, 156/327, 338; 428/317.1, 317.3, 317.7, 343, 354, 356, 355 AC

(56) References Cited

U.S. PATENT DOCUMENTS

| | | |
|---|---|---|
| 3,993,826 * | 11/1976 | Butler et al. . |
| 4,358,489 | 11/1982 | Green . |
| 4,536,441 | 8/1985 | Schmeer . |
| 4,554,183 | 11/1985 | Erickson . |
| 4,574,697 * | 3/1986 | Feeley . |
| 4,726,982 | 2/1988 | Traynor . |
| 4,871,631 | 10/1989 | Pieper . |
| 4,872,937 | 10/1989 | Gouldy . |
| 5,074,209 * | 12/1991 | Prittie . |
| 5,275,102 * | 1/1994 | Prittie . |
| 5,476,712 * | 12/1995 | Hartman et al. ................... 428/317.3 |
| 5,516,581 * | 5/1996 | Kreckel et al. .................... 428/317.3 |

FOREIGN PATENT DOCUMENTS

| | | |
|---|---|---|
| 0 206 760 | 6/1986 | (EP) . |
| 0 320 676 | 11/1988 | (EP) . |

\* cited by examiner

*Primary Examiner*—Curtis Mayes
(74) *Attorney, Agent, or Firm*—Norris McLaughlin & Marcus

(57) ABSTRACT

A plate mounting tape with a self-adhesive composition on both sides of a polyolefin substrate, in particular PE foam film substrate having low variation in thickness and having a compressive stress value of 10–80, in particular 10–50 N/cm$^2$ under 50% compressive deformation.

8 Claims, 1 Drawing Sheet

PLATE MOUNTING TAPE

Figure 1:
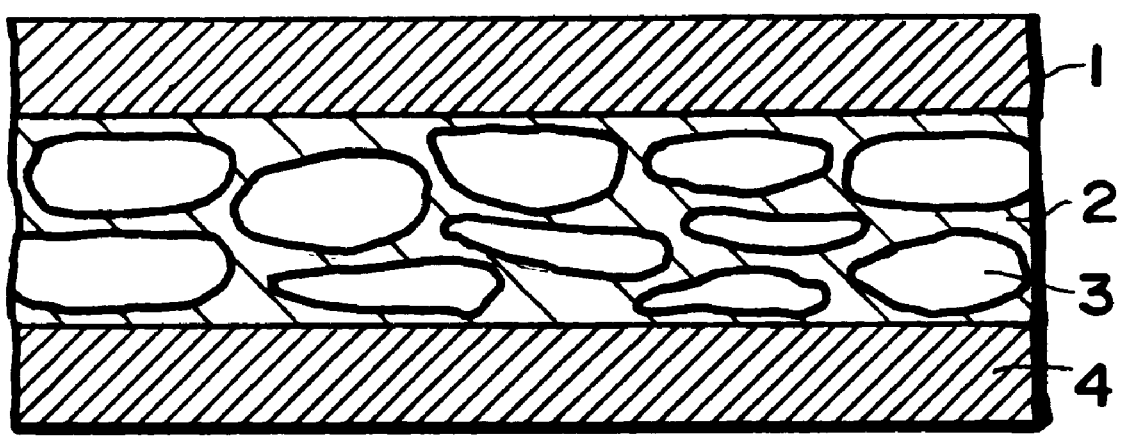

This is a division of Ser. No. 08/749,591, filed on Nov. 15, 1996, now abandoned, which is a division of Ser. No. 07/795,584, filed on Nov. 21, 1991, now abandoned.

The invention relates to a plate mounting tape, as used in the prior art with a foam substrate and adhesive composition on both sides.

Mounting tapes with foam film substrate have been known and commercially available for some time. However, as before, the production of mounting tapes with low variation in thickness is a fundamental problem, in particular in the case of thickness tolerances of less than ±15%. Small deviations in the thickness from the desired value as well as small overall thicknesses are desired or necessary in many application areas for double-sided foam adhesive tapes, in particular also in the printing industry. In the case of the flexographic printing process, it is for example advantageous for mounting the polymer printing plate onto the impression cylinder by means of a double-sided adhesive tape if the adhesive tape has a suitable compressive stress value and small variations in thickness. The printing quality can namely be increased considerably in this way. However, after completion of the printing operation, the adhesive tape must allow itself to be detached again both from the impression cylinder and from the plate, leaving behind as little residue as possible, which presupposes an adequate tearing strength.

Until now, for this application area use has been made of adhesive tapes based on surface-finished polyurethane foams (Messrs Mayser, Lindenberg) or split or ground polyethylene foams or polyethylene vinyl acetate copolymer foams (Messrs Alveo, Lucerne). In both cases, to obtain adequate tearing strength together with the low compressive stress value necessary at the same time, reinforcement with a PVC, polyester or similar film is necessary. This additional production step and use of material not only makes the product considerably more expensive, but has an adverse effect on the compressive stress value, since part of the maximum thickness available has to be taken up by an incompressible film and a laminating adhesive. The PE-based foam films used do admittedly have the advantage over the above-mentioned PU-based films that they are available with substantially lower compressive stress values. The closed-cell PE films are also superior to the open-cell PU films with respect to the deterioration in recovery behaviour due to fatigue of the material after numerous compressing and relieving cycles. However, a major problem is represented by the fact that PE foam films are commercially available only in relatively large thicknesses (>500 $\mu$m) and by the considerable variations in thickness. These rule out use of the unmachined films for a broad range of the application areas mentioned above. The laborious splitting or grinding of the foam film does offer a solution to this. However, this causes the material to lose even more of its tearing strength and the closed-cell nature of the foam is also reduced; the advantage mentioned is partly lost again.

The object of the invention was to provide a remedy for this, in particular to provide a plate mounting tape which has the advantages of a closed-cell polyolefin substrate, in particular a PE foam film substrate, and at the same time exhibits a small overall thickness and variation in thickness, as required by the printing industry.

Accordingly, the invention relates to a plate mounting tape as characterised more precisely herein.

The foam film as substrate material advantageously consists of polyolefin, in particular of polyethylene or a polyethylene copolymer, for example with vinyl acetate. The substrate film has in this case a thickness of 200–1000 $\mu$m, in particular 200–500 $\mu$m, a density of 50–300 kg/m$^3$, a compressive stress value of 10–80 N/cm$^2$ under 50% compressive deformation (as specified in DIN 53 577) and preferably such a value of 10–50 N/cm$^2$. In particular, the adhesive tape according to the invention is characterised by a small thickness and also variation in thickness, which is advantageously up to no more than ±12%, in particular 5–10%.

According to the invention, a monoaxially stretched polyolefin foam film, in particular a PE or PE copolymer foam film, is used advantageously as substrate material for such an adhesive tape. This stretching operation makes it possible in the first place to obtain suitable substrate materials having a thickness of less than 500 $\mu$m, but substrates of up to 1000 $\mu$m are also suitable. For example, a 350 $\mu$m thick film can be obtained from a 500 $\mu$m thick PE/EVA foam film having a density of 200 kg/m$^3$ with a stretching ratio of 1:2.

In addition, the thickness tolerance can be advantageously reduced to less than ±10% by an in-line thickness measurement of the foam and corresponding control of the stretching ratio, in particular with a longitudinal stretching ratio of 1.5–4, preferably 2–2.5. Since thicker foam films can also be calibrated in this way, many new application areas for adhesive tapes are opened up for the first time on account of the relatively inexpensive foam, in particular also for the application mentioned above in flexographic printing.

A particularly favourable effect for the final product is the tearing strength of the material, increased by up to 30% due to stretching, since this dispenses with the otherwise necessary reinforcement with a film. A double-sided adhesive tape produced from the stretched material can, for example, even in thicknesses of less than 500 $\mu$m with a density of 200 kg/m$^3$ be removed again without tearing off or being torn into, even with adhesive forces of 5 N/cm.

A particular advantage in setting a desired thickness by stretching of the foam film instead of splitting or grinding is also that in this way there is a gain in material in the form of a larger useful surface area, whereas in the case of the other methods part of the material used ends up as scrap.

In addition to these advantages, it has surprisingly been found that, although the density remains virtually unchanged in stretching, the compressive stress value of the materials decreases by up to 30%. This effect represents a particular advantage for use in the adhesive bonding of printing plates.

In FIG. 1, a diagrammatic cross-section through a plate mounting tape according to the invention is shown, with self-adhesive composition 1 and 4, PE foam film substrate 2 and foam voids 3. The self-adhesive composition (1, 4) may be a composition based on natural rubber, synthetic rubber or, in particular, a polyacrylate base.

EXAMPLE 1

A 550±20% thick, crosslinked PE foam film (TE 500.5 of Messrs Alveo, containing vinyl acetate in the polymer) was monoaxially stretched longitudinally at room temperature. The stretching rate was 10 m/min, the stretching gap 5 cm. The thickness was measured continuously during stretching. The stretching ratio was 1:2 to 1:2.5. A material having a thickness of 380 $\mu$m±10% was obtained. The compressive stress value (50% compressive deformation) decreased from 38 to 30 N/cm$^2$, the tearing strength increased from 18 to 23 N/cm, the elongation at tear decreased from 300% to 100%. The material lost 6% in width, but yielded a 25%-increased running length.

After corona pretreatment on both sides of the foam, 30 g/m² of a polyacrylate adhesive composition (German Patent Specification 1,569,898, Example 2) was applied to each side by the transfer method (spreading of the solvent-containing adhesive composition onto release paper, drying at 80° C., laminating onto the foam, removal of one of the release papers).

The finished product had an overall thickness of 44 μm±10%, the adhesive strength of the product covered on one side by a 23 μm-thick polyester film (Hostaphan, Messrs Hoechst) was 4.8 N/cm (AFERA 4001 P 11).

Consequently, when used for plate adhesive bonding, an excellent printed image was achieved.

What is claimed is:

1. A method for removable mounting of a flexographic printing plate to and from an impression cylinder, said method comprising:

a) adhering a first face of a double-faced adhesive tape to said cylinder;

b) adhering said printing plate to a second face of said double-faced adhesive tape; and thereafter c) removing both the printing plate and the cylinder from said double-faced adhesive tape;

wherein the double-faced adhesive tape is a double-faced adhesive tape consisting of a polyolefin foam substrate and a self-adhesive composition on both sides of the substrate, the self-adhesive composition permitting subsequent separation from surfaces between which the tape is applied, the polyolefin foam being monoaxially stretched, having a thickness of 200 to 1000 μm with a variation of no greater than ±12%, and having a compressive stress value of 10 to 80 N/cm² under 50% compressive stress deformation.

2. A method according to claim 1, wherein the polyolefin foam substrate is cross-linked.

3. A method according to claim 1, wherein the polyolefin foam substrate is a polyethylene foam having a compressive stress value of 10 to 50 N/cm² under 50% compressive stress deformation and a variation in thickness of 5 to 10%.

4. A method according to claim 1, wherein the polyolefin foam substrate comprises a polymer or copolymer of ethylene.

5. A method according to claim 1, wherein the polyolefin foam substrate in production was monoaxially stretched at a ratio of 1.5 to 4.

6. A method according to claim 5, wherein the polyolefin foam substrate in production was monoaxially stretched at a ratio of 2 to 2.5.

7. A method according to claim 1, wherein the self-adhesive composition comprises a polyacrylate, natural rubber or synthetic rubber.

8. A method according to claim 1, wherein the same self-adhesive composition is applied to both sides of the polyolefin foam substrate and in the same amount.

* * * * *